Patented Sept. 19, 1922.

1,429,455

UNITED STATES PATENT OFFICE.

REECE RICE, OF INDIANAPOLIS, INDIANA, ASSIGNOR, BY MESNE ASSIGNMENTS, TO RICE IMPROVED VALVE & MANUFACTURING COMPANY, OF INDIANAPOLIS, INDIANA, A CORPORATION OF INDIANA.

FILLING COMPOSITION.

No Drawing.   Application filed August 5, 1920.   Serial No. 401,424.

*To all whom it may concern:*

Be it known that I, REECE RICE, a citizen of the United States, residing at Indianapolis, in the county of Marion and State of Indiana, have invented a Filling Composition, of which the following is a specification.

This invention relates to a composition especially designed for use as a leakproof filler for valve stem bearings and the like.

The object of the invention is to provide a filler of this character so compounded as to form a tight joint to prevent the leakage of fluids around the stem or rod of a valve or piston and yet permit the reciprocating part to move with ease thereby reducing friction to a minimum and obtaining ease of operation.

Another object is to produce a composition of this character which will not blow out when the valve is under pressure, open or partially open.

Another object is to provide such a filler so compounded as to possess qualities of longevity and thus avoid the necessity of constant recharging.

The composition constituting this invention is composed of the following materials combined in the proportions set forth, to wit—

Pulverized asbestor, 30 parts; wood fibre or wood fillings, 20 parts; ground hemp, 25 parts; a starchy cereal such as bran, cornmeal, oatmeal, a granular wheat like Cream of Wheat, Ralston's Breakfast Food, etc., 25 parts. These proportions, however, may be somewhat varied without departure from the invention.

The ingredients above set forth are preferably combined with enough flake graphite to provide adequate lubrication and to secure a uniform mixture and this mixture is inserted in the filler chamber of a valve or piston being held in place by a stuffing nut or filler ring. This composition when so inserted forms a leakproof filler for the movable stem or rod and it cannot blow out when the valve is under pressure or when it is partially or entirely open nor when the piston is subjected to pressure.

The compound so formed possesses qualities of longevity and when once applied to a bearing will not have to be recharged for a long time. It also forms a leakproof joint while permitting the reciprocating part to move with ease.

While this filler is especially designed for valves or pistons obviously it may be used for other purposes as a filler with a bearing of any moving part or for that matter for a stationary part.

What I claim is:

1. A packing for movable elements, comprising pulverized asbestos, thirty parts; wood fibre, twenty part; ground hemp, twenty-five parts; and a starchy cereal, twenty-five parts.

2. A packing for movable elements, comprising pulverized asbestos, wood fibre, ground hemp, and a starchy cereal.

3. A packing for movable elements, composed of pulverized asbestos, thirty parts; wood fibre, twenty parts; ground hemp, twenty-five parts; and a starchy cereal, twenty-five parts, together with flake graphite.

4. A packing for movable elements, composed of pulverized asbestos, wood fibre, ground hemp, and a starchy cereal, together with flake graphite.

In testimony whereof, I affix my signature hereto.

REECE RICE.